United States Patent
Nakao et al.

(10) Patent No.: US 11,772,129 B2
(45) Date of Patent: Oct. 3, 2023

(54) ULTRASONIC APPARATUS

(71) Applicant: Murata Manufacturing Co., Ltd., Nagaokakyo (JP)

(72) Inventors: Motoyasu Nakao, Nagaokakyo (JP); Kosuke Watanabe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 1113 days.

(21) Appl. No.: 16/512,428

(22) Filed: Jul. 16, 2019

(65) Prior Publication Data

US 2019/0337015 A1    Nov. 7, 2019

Related U.S. Application Data

(63) Continuation of application No. PCT/JP2018/000269, filed on Jan. 10, 2018.

(30) Foreign Application Priority Data

Jan. 25, 2017  (JP) .................................. 2017-011456

(51) Int. Cl.
*B06B 1/02*   (2006.01)
*B06B 1/06*   (2006.01)

(52) U.S. Cl.
CPC .......... *B06B 1/0215* (2013.01); *B06B 1/0692* (2013.01); *B06B 2201/30* (2013.01); *B06B 2201/40* (2013.01)

(58) Field of Classification Search
CPC . B06B 1/0215; B06B 1/0692; B06B 2201/30; B06B 2201/40
See application file for complete search history.

(56) References Cited

U.S. PATENT DOCUMENTS 5,757,104 A * 5/1998 Getman ................. H03H 9/132
  310/317
8,699,299 B2 * 4/2014 Horsky ................. B06B 1/0253
  367/95

(Continued)

FOREIGN PATENT DOCUMENTS

EP   0 706 835 A1    4/1996
JP   01270499 A  * 10/1989

(Continued)

OTHER PUBLICATIONS

Official Communication issued in corresponding European Patent Application No. 18745194.3, dated Oct. 19, 2020.

(Continued)

*Primary Examiner* — J. San Martin
(74) *Attorney, Agent, or Firm* — KEATING & BENNETT, LLP (57) ABSTRACT

An ultrasonic apparatus includes an ultrasonic transducer, a transmitting circuit, a receiving circuit, a Q-factor measuring circuit, and a frequency measuring circuit. The ultrasonic transducer is a three-terminal ultrasonic transducer that includes a transmitting electrode, a receiving electrode, and a common electrode. The transmitting circuit outputs a driving signal to the transmitting electrode to cause the ultrasonic transducer to transmit ultrasonic waves. The receiving circuit receives a receive signal from the receiving electrode. The frequency measuring circuit measures a resonant frequency of the ultrasonic transducer from a reverberation signal in the receive signal. The Q-factor measuring circuit measures a Q factor of the ultrasonic transducer from the reverberation signal in the receive signal.

12 Claims, 12 Drawing Sheets

(56) References Cited

U.S. PATENT DOCUMENTS

2018/0003808 A1 1/2018 Niwa
2019/0339370 A1* 11/2019 Watanabe .............. G01H 13/00

FOREIGN PATENT DOCUMENTS

| | | |
|---|---|---|
| JP | 2998232 B2 | 1/2000 |
| JP | 2001-119786 A | 4/2001 |
| JP | 2002-336248 A | 11/2002 |
| JP | 2005-039720 A | 2/2005 |
| JP | 2014-115255 A | 6/2014 |
| JP | 2015-010888 A | 1/2015 |
| JP | 2016-125987 A | 7/2016 |

OTHER PUBLICATIONS

Official Communication issued in International Patent Application No. PCT/JP2018/000269, dated Apr. 10, 2018.

* cited by examiner

ULTRASONIC APPARATUS

CROSS REFERENCE TO RELATED APPLICATIONS

This application claims the benefit of priority to Japanese Patent Application No. 2017-011456 filed on Jan. 25, 2017 and is a Continuation Application of PCT Application No. PCT/JP2018/000269 filed on Jan. 10, 2018. The entire contents of each application are hereby incorporated herein by reference.

BACKGROUND OF THE INVENTION

1. Field of the Invention

The present invention relates to an ultrasonic apparatus, and particularly, to a technique for measuring the Q factor and the resonant frequency of a three-terminal ultrasonic transducer that includes a transmitting terminal and a receiving terminal independent of each other.

2. Description of the Related Art

Ultrasonic apparatuses are used in practice, in which an ultrasonic transducer transmits ultrasonic waves, receives reflected waves from an object to be detected, and thus measures, for example, a distance to the object to be detected.

If a foreign substance, such as mud, adheres to the vibrating surface of the ultrasonic transducer, or if water droplets adhering to the vibrating surface freeze, an ultrasonic vibrator may be unable to properly perform transmission and reception. This may lead to failure in proper detection of an object to be detected existing in front of the ultrasonic vibrator.

Japanese Patent No. 2998232 discloses an ultrasonic sensor that is capable of detecting adhesion of a foreign substance, such as mud. This ultrasonic sensor detects the resonant frequency of an ultrasonic vibrator, monitors and compares the resonant frequency with the natural frequency, and thus detects an anomaly in the operation of the ultrasonic vibrator.

Japanese Unexamined Patent Application Publication No. 2015-10888 discloses a configuration that measures the resonant frequency and the Q factor of an ultrasonic vibrator from reverberant vibration generated in the ultrasonic vibrator by transmitting an ultrasonic pulse, estimates an output amplitude using the measured resonant frequency and Q factor, and thus improves the performance of detecting an object located at a short distance.

The ultrasonic transducer used in both of Japanese Patent No. 2998232 and Japanese Unexamined Patent Application Publication No. 2015-10888 includes a two-terminal ultrasonic vibrator in which a transmitting vibrator (transmitting electrode) for transmitting ultrasonic waves and a receiving vibrator (receiving electrode) for receiving reflected waves are combined. In the measurement of the resonant frequency and the Q factor in such a two-terminal ultrasonic transducer, the impedance of a transmitting circuit and a receiving circuit connected to a transmitting and receiving vibrator may interfere with accurate measurement of the resonant frequency and the Q factor.

Particularly in the configuration disclosed in Japanese Unexamined Patent Application Publication No. 2015-10888, where a transformer for boosting the voltage of a transmit signal is connected to the transmitting circuit (driving circuit), the inductance of the transformer affects the resonant frequency and the Q factor of the ultrasonic transducer.

SUMMARY OF THE INVENTION

Preferred embodiments of the present invention provide ultrasonic apparatuses each of which accurately measures the resonant frequency and the Q factor of an ultrasonic transducer, and thus achieves improved accuracy in detecting anomalies of the ultrasonic transducer.

An ultrasonic apparatus according to a preferred embodiment of the present invention includes an ultrasonic transducer, a transmitting circuit, a receiving circuit, a frequency measuring circuit, and a Q-factor measuring circuit. The ultrasonic transducer is a three-terminal ultrasonic transducer that includes a transmitting electrode, a receiving electrode, and a common electrode. The transmitting circuit outputs a driving signal to the transmitting electrode to cause the ultrasonic transducer to transmit ultrasonic waves. The receiving circuit receives a receive signal from the receiving electrode. The frequency measuring circuit measures a resonant frequency of the ultrasonic transducer from a reverberation signal in the receive signal. The Q-factor measuring circuit measures a Q factor of the ultrasonic transducer from the reverberation signal in the receive signal.

The ultrasonic apparatus preferably further includes a determiner to determine an anomaly of the ultrasonic transducer based on the Q factor measured by the Q-factor measuring circuit and the resonant frequency measured by the frequency measuring circuit.

The ultrasonic apparatus preferably further includes a switch to ground the transmitting electrode when the Q-factor measuring circuit measures the Q factor and the frequency measuring circuit measures the resonant frequency.

The Q-factor measuring circuit preferably includes an envelope detecting circuit, a damping time measuring circuit, and a Q-factor calculating circuit. The envelope detecting circuit detects an envelope of an amplitude of the reverberation signal. The damping time measuring circuit measures a damping time taken by the amplitude to decay from a first amplitude to a second amplitude on the envelope. The Q-factor calculating circuit calculates the Q factor of the ultrasonic transducer based on the first and second amplitudes, the damping time, and the resonant frequency of the ultrasonic transducer.

The ultrasonic apparatus preferably further includes a clock signal generating circuit to generate a clock signal used in common by the Q-factor measuring circuit and the frequency measuring circuit.

Preferred embodiments of the present invention reduce the influence of the impedance of the transmitting circuit on the measurement of the resonant frequency and the Q factor of the ultrasonic transducer, and enable accurate measurement of the resonant frequency and the Q factor. This improves accuracy in detecting anomalies of the ultrasonic transducer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail with reference to the drawings. The same or equivalent elements and portions in the drawings are denoted by the same reference numerals and their description will not be repeated.

First Preferred Embodiment

Figure 1:
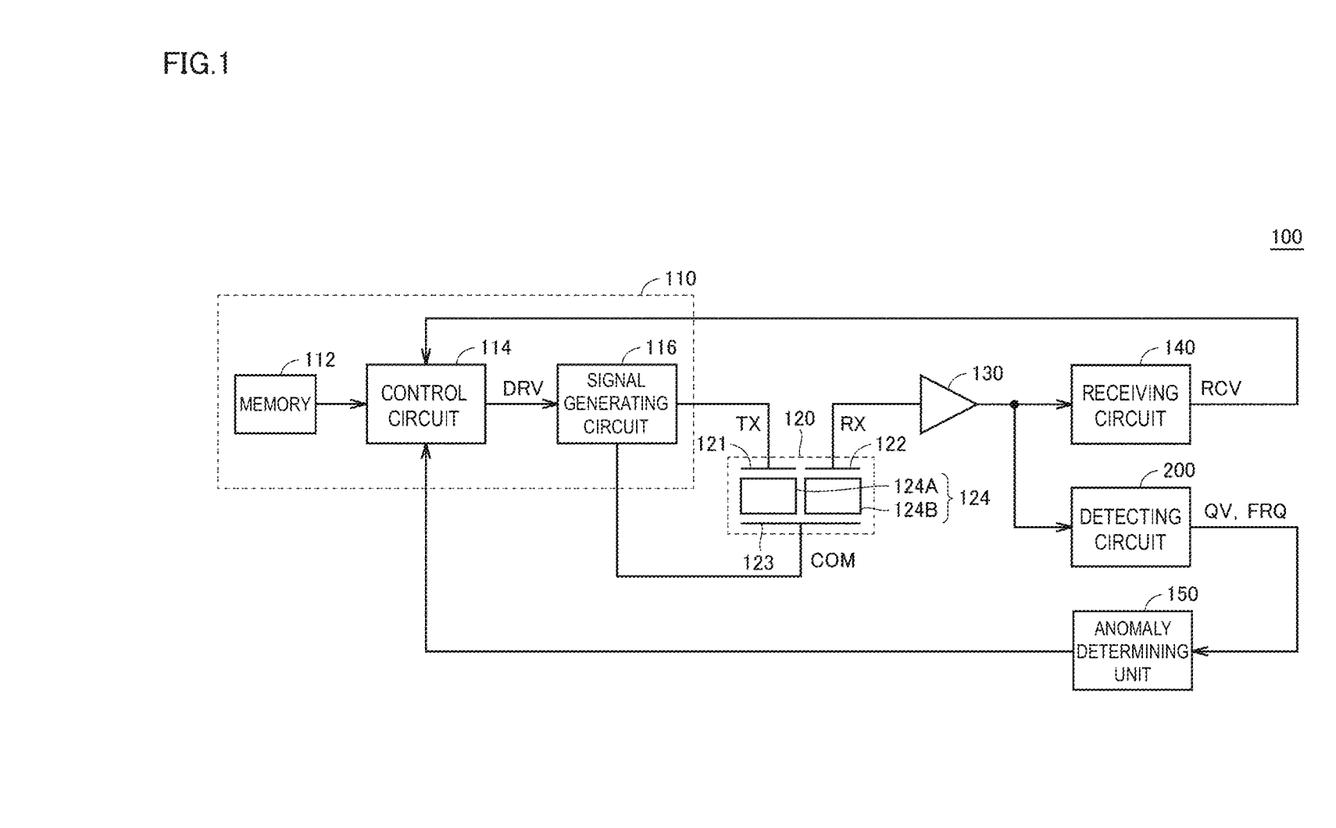
FIG. 1 is a block diagram illustrating a configuration of an ultrasonic apparatus according to a first preferred embodiment of the present invention.

FIG. 1 is a block diagram illustrating a configuration of an ultrasonic apparatus 100 according to a first preferred embodiment of the present invention. Referring to FIG. 1, the ultrasonic apparatus 100 includes a transmitting circuit 110, an ultrasonic transducer 120, an amplifier 130, a receiving circuit 140, an anomaly determining circuit 150, and a detecting circuit 200.

The transmitting circuit 110 transmits ultrasonic waves from the ultrasonic transducer 120 by driving the ultrasonic transducer 120. The transmitting circuit 110 includes a memory 112, a control circuit 114, and a signal generating circuit 116. The control circuit 114 reads data stored in the memory 112 and outputs, to the signal generating circuit 116, a control signal DRV suitable to drive the ultrasonic transducer 120. Based on the control signal DRV output from the control circuit 114, the signal generating circuit 116 generates an alternating-current voltage (ultrasonic pulse: transmit signal) from a direct-current voltage. The signal generating circuit 116 amplifies the generated alternating-current voltage as appropriate, and supplies the amplified alternating-current voltage to the ultrasonic transducer 120. The configuration of the signal generating circuit 116 will be described in detail below.

The ultrasonic transducer 120 is a three-terminal ultrasonic transducer that includes a transmitting electrode 121 (terminal TX), a receiving electrode 122 (terminal RX), a common electrode 123 (terminal COM), and a piezoelectric body 124. The transmitting electrode 121 and the common electrode 123 are connected to the signal generating circuit 116 of the transmitting circuit 110. The receiving electrode 122 is connected to the receiving circuit 140 and the detecting circuit 200, with the amplifier 130 interposed therebetween.

The piezoelectric body 124 includes a transmitting region 124A to transmit ultrasonic waves, and a receiving region 124B to receive reflected ultrasonic waves. The transmitting electrode 121 is disposed opposite the common electrode 123, with the transmitting region 124A of the piezoelectric body 124 interposed therebetween, and is electrically connected to the transmitting region 124A. The receiving electrode 122 is disposed opposite the common electrode 123, with the receiving region 124B of the piezoelectric body 124 interposed therebetween, and is electrically connected to the receiving region 124B. The common electrode 123 is electrically connected to both of the transmitting region 124A and the receiving region 124B.

The transmitting electrode 121 receives a transmit signal from the signal generating circuit 116. The transmitting region 124A of the piezoelectric body 124 vibrates the transmitting electrode 121 in accordance with the transmit signal, and transmits ultrasonic waves from the transmitting electrode 121, for example, into the air.

The ultrasonic waves transmitted from the transmitting electrode 121 are reflected by an object. The receiving electrode 122 receives the reflected waves from the object and vibrates. The receiving region 124B of the piezoelectric body 124 converts the vibration of the transmitting electrode 121 into an electric signal, and outputs the electric signal as a receive signal to the amplifier 130.

The amplifier 130 preferably is, for example, an inverting amplifier circuit that includes a resistor and an operational amplifier (neither of which is shown). The amplifier 130 amplifies the receive signal from the transmitting electrode 121 and outputs it to the receiving circuit 140 and the detecting circuit 200.

The receiving circuit 140 receives the receive signal amplified by the amplifier 130. The receiving circuit 140 detects the voltage value of the receive signal, and outputs a detected value RCV to the control circuit 114.

Based on the receive signal amplified by the amplifier 130, the detecting circuit 200 measures a resonant frequency (FRQ) and a Q factor (QV) of the ultrasonic transducer 120 as described below. The measured resonant frequency and the Q factor are output to the anomaly determining circuit 150. In the present preferred embodiment, the detecting circuit 200 is connected to the receiving electrode 122 of the three-terminal ultrasonic transducer 120, in which the transmitting electrode 121 and the receiving electrode 122 are separated. This reduces the influence of the impedance of the transmitting circuit 110 on the measurement of the resonant frequency and the Q factor.

Some recent systems that include an ultrasonic transducer originally to detect the envelope of a reverberation signal in a receive signal, such as that described above, and measure a resonant frequency. Therefore, when a Q-factor measuring circuit is connected to the receiving circuit, the envelope detecting function and the resonant frequency measuring function, which are originally included, are able to be combined for Q factor measurement. This makes it relatively easy to provide the Q-factor measuring circuit.

Based on the resonant frequency and the Q factor measured in the detecting circuit 200, the anomaly determining circuit 150 makes an anomaly determination as to whether there is adhesion of, for example, water droplets or mud to the ultrasonic transducer 120. The result of the determination made by the anomaly determining circuit 150 is output to the control circuit 114. Although the anomaly determining circuit 150 in FIG. 1 is illustrated as a circuit independent of the control circuit 114, the anomaly determining circuit 150 may be included in the control circuit 114.

Based on the detected value RCV from the receiving circuit 140, the control circuit 114 identifies information about the presence and movement of an object and the distance to the object. If an anomaly is detected by the anomaly determining circuit 150, the control circuit 114 notifies the user of the occurrence of the anomaly using a notification device (not shown). The ultrasonic apparatus 100 is able to be used, for example, as an ultrasonic sensor mounted on a vehicle.

Figure 2:
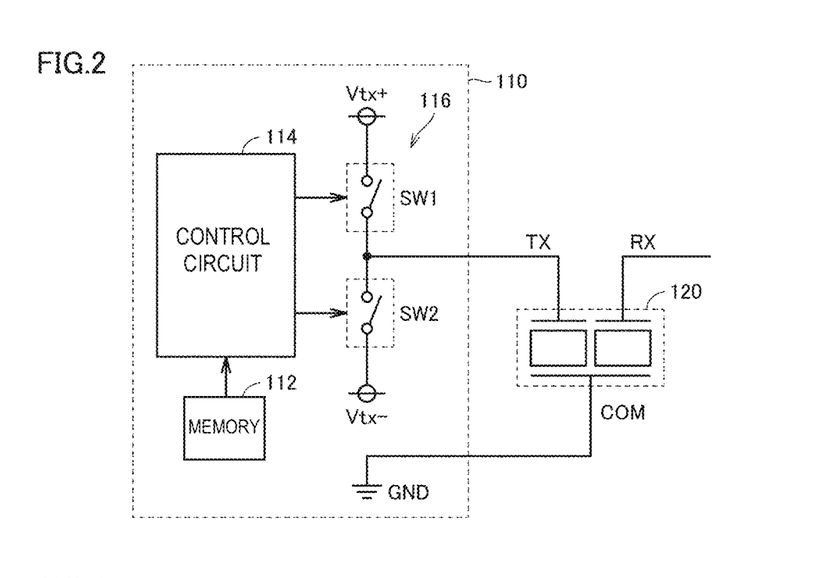
FIG. 2 is a diagram illustrating a first example of a transmitting circuit illustrated in FIG. 1.

FIG. 2 is a diagram for explaining details of the transmitting circuit 110 illustrated in FIG. 1. Referring to FIG. 2, the signal generating circuit 116 includes a positive power supply $V_{tx+}$, a negative power supply $V_{tx-}$, and switches SW1 and SW2. The switches SW1 and SW2 are connected in series between the positive power supply $V_{tx+}$ and the negative power supply $V_{tx-}$ to define a half-bridge circuit. A connection node between the switch SW1 and the switch SW2 is connected to the transmitting electrode 121 (TX) of the ultrasonic transducer 120. The switches SW1 and SW2 are controlled by the control signal DRV from the control circuit 114 and generate, from the direct-current positive power supply $V_{tx+}$ and negative power supply $V_{tx-}$, an alternating-current voltage (transmit signal) to drive the ultrasonic transducer 120. Specifically, by bringing the switch SW1 into conduction and bringing the switch SW2 out of conduction, a positive pulse is output to the ultrasonic transducer 120. Conversely, by bringing the switch SW1 out of conduction and bringing the switch SW2 into conduction, a negative pulse is output to the ultrasonic transducer 120.

The common electrode 123 (COM) of the ultrasonic transducer 120 is connected to a ground potential GND in the transmitting circuit 110.

Figure 3:
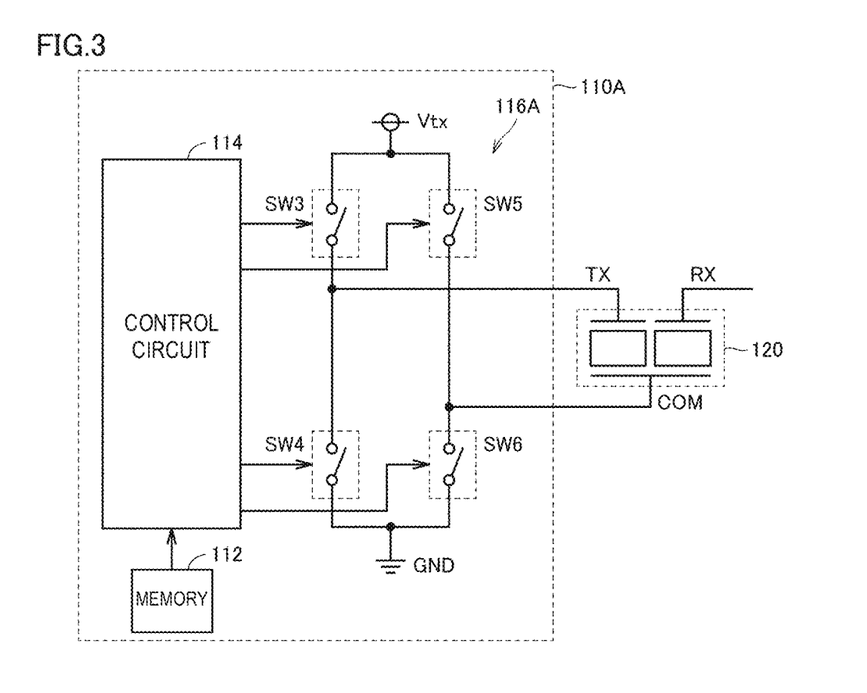
FIG. 3 is a diagram illustrating a second example of the transmitting circuit illustrated in FIG. 1.

FIG. 3 is a diagram illustrating another example of the transmitting circuit illustrated in FIG. 1. A transmitting circuit 110A illustrated in FIG. 3 differs from the transmitting circuit in FIG. 2 in that a signal generating circuit 116A preferably defines a full-bridge circuit.

Referring to FIG. 3, the signal generating circuit 116A includes a direct-current power supply $V_{tx}$ and switches SW3 to SW6. The switches SW3 and SW4 are connected in series between the direct-current power supply $V_{tx}$ and the ground potential GND. The switches SW5 and SW6 are also connected in series between the direct-current power supply $V_{tx}$ and the ground potential GND. The switches SW3 to SW6 thus define a full-bridge circuit.

The transmitting electrode 121 (TX) of the ultrasonic transducer 120 is connected to a connection node between the switch SW3 and the switch SW4. The common electrode 123 (COM) of the ultrasonic transducer 120 is connected to a connection node between the switch SW5 and the switch SW6.

The switches SW3 to SW6 are controlled by the control signal DRV from the control circuit 114 and generate, from the direct-current power supply $V_{tx}$, an alternating-current voltage (transmit signal) for driving the ultrasonic transducer 120. Specifically, by bringing the switches SW3 and SW6 into conduction and bringing the switches SW4 and SW5 out of conduction, a positive pulse is output to the ultrasonic transducer 120. Conversely, by bringing the switches SW3 and SW6 out of conduction and bringing the switches SW4 and SW5 into conduction, a negative pulse is output to the ultrasonic transducer 120.

With reference to FIGS. 4A and 4B and FIGS. 5A and 5B, a technique will be described which determines, from the resonant frequency and the Q factor of the ultrasonic transducer 120, whether there is adhesion of water droplets and/or mud to the ultrasonic transducer 120.

Figure 4A:
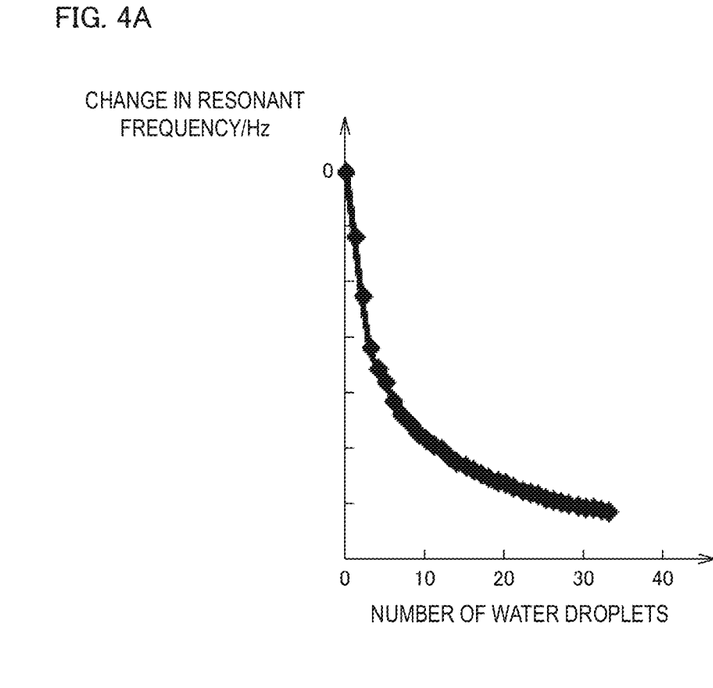
FIGS. 4A and 4B are graphs showing a relationship between adhesion of water droplets and changes in Q factor and resonant frequency.
Figure 4B:
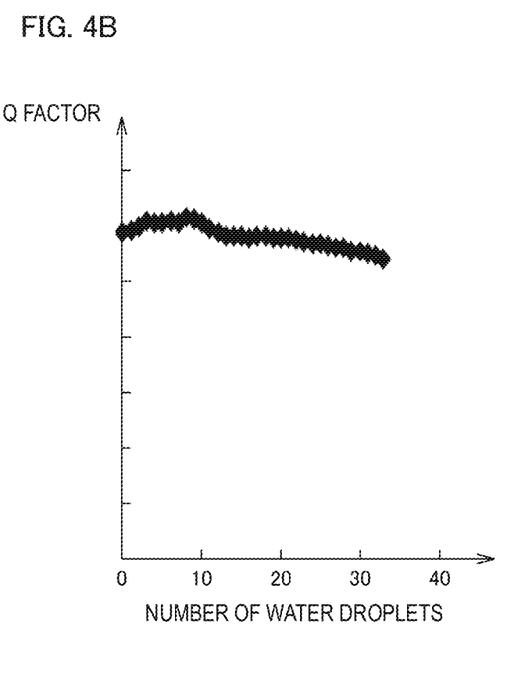

FIGS. 4A and 4B are graphs showing how the resonant frequency and the Q factor change when water droplets adhere to the surface of the ultrasonic transducer 120. FIG. 4A shows a relationship between the amount of adhesion of water droplets (i.e., the number of water droplets) and the resonant frequency, and FIG. 4B shows a relationship between the amount of adhesion of water droplets (i.e., the number of water droplets) and the Q factor. As can be seen from FIGS. 4A and 4B, the resonant frequency decreases as the number of water droplets increases, whereas the Q factor remains the same or substantially the same regardless of the number of water droplets.

Figure 5A:
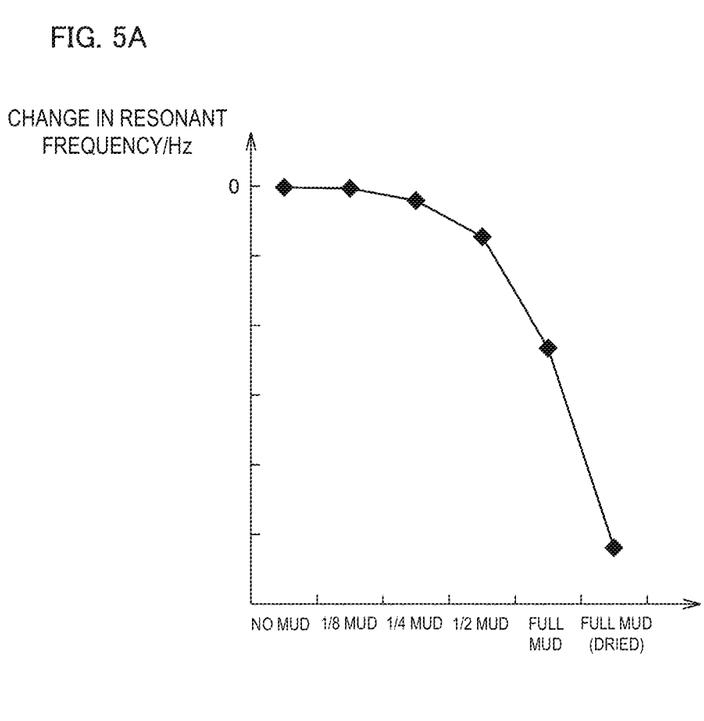
FIGS. 5A and 5B are graphs showing a relationship between adhesion of mud and changes in Q factor and resonant frequency.
Figure 5B:
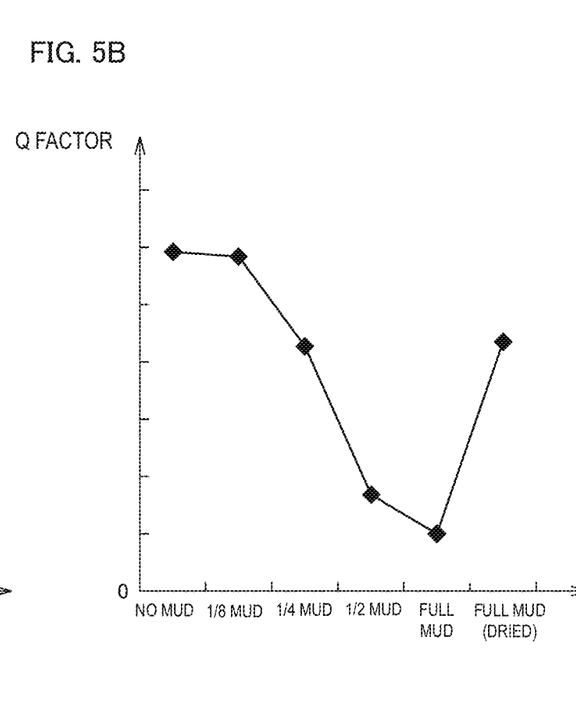

FIGS. 5A and 5B are graphs showing how the resonant frequency and the Q factor change when mud adheres to the surface of the ultrasonic transducer 120. FIG. 5A shows a relationship between the amount of adhesion of mud and the resonant frequency, and FIG. 5B shows a relationship between the amount of adhesion of mud and the Q factor. As can be seen from FIGS. 5A and 5B, when there is adhesion of mud, both of the resonant frequency and the Q factor change depending on the degree of adhesion of mud (the amount of adhesion and the state of dryness).

Thus, measuring the changes in the resonant frequency and Q factor of the ultrasonic transducer 120 enables detection of an anomaly that is adhesion of water droplets or mud to the surface of the ultrasonic transducer 120. To accurately detect an anomaly associated with adhesion of water droplets or mud to the ultrasonic transducer 120, it is necessary to improve accuracy in measuring the resonant frequency and the Q factor.

Figure 6:
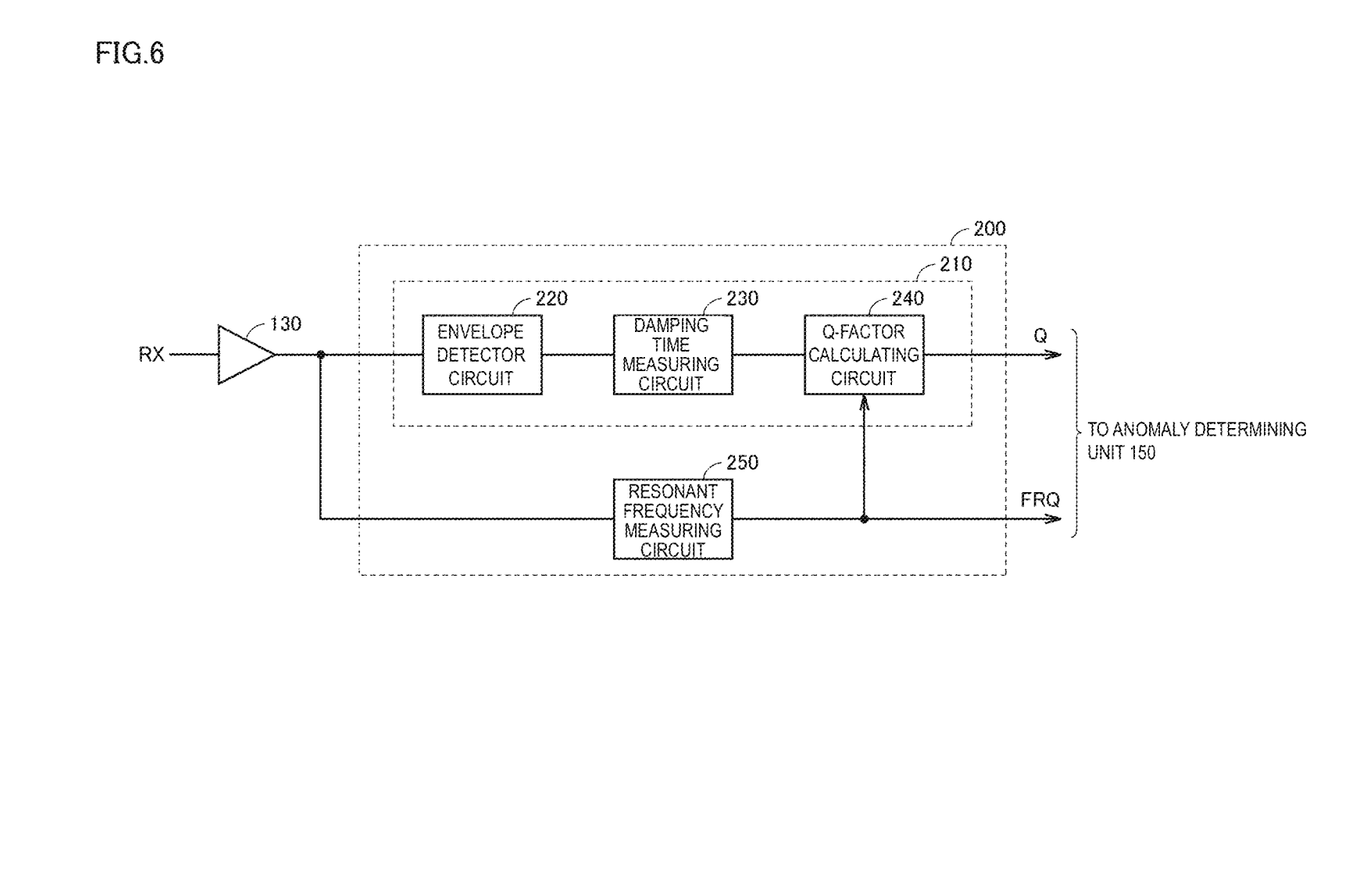
FIG. 6 is a diagram illustrating details of a detecting circuit illustrated in FIG. 1.

FIG. 6 is a diagram illustrating details of the detecting circuit 200 illustrated in FIG. 1. Referring to FIG. 6, the detecting circuit 200 includes a Q-factor measuring circuit 210 and a resonant frequency measuring circuit 250. The Q-factor measuring circuit 210 includes an envelope detector circuit 220, a damping time measuring circuit 230, and a Q-factor calculating circuit 240.

The resonant frequency measuring circuit 250 receives a receive signal amplified by the amplifier 130. From a reverberation signal in the receive signal, the resonant frequency measuring circuit 250 measures the resonant frequency of the ultrasonic transducer 120. The measured resonant frequency is output to the Q-factor calculating circuit 240 and the anomaly determining circuit 150.

The envelope detector circuit 220 calculates the envelope of the reverberation signal in the receive signal. The damping time measuring circuit 230 measures the damping time between amplitude voltages at any two points on the envelope obtained by the envelope detector circuit 220. The Q-factor calculating circuit 240 calculates the Q factor using the amplitude voltages at two points on the envelope used in the damping time measuring circuit 230, the damping time therebetween, and the resonant frequency measured by the resonant frequency measuring circuit 250. The Q-factor calculating circuit 240 then outputs the calculated Q factor to the anomaly determining circuit 150.

Figure 7:
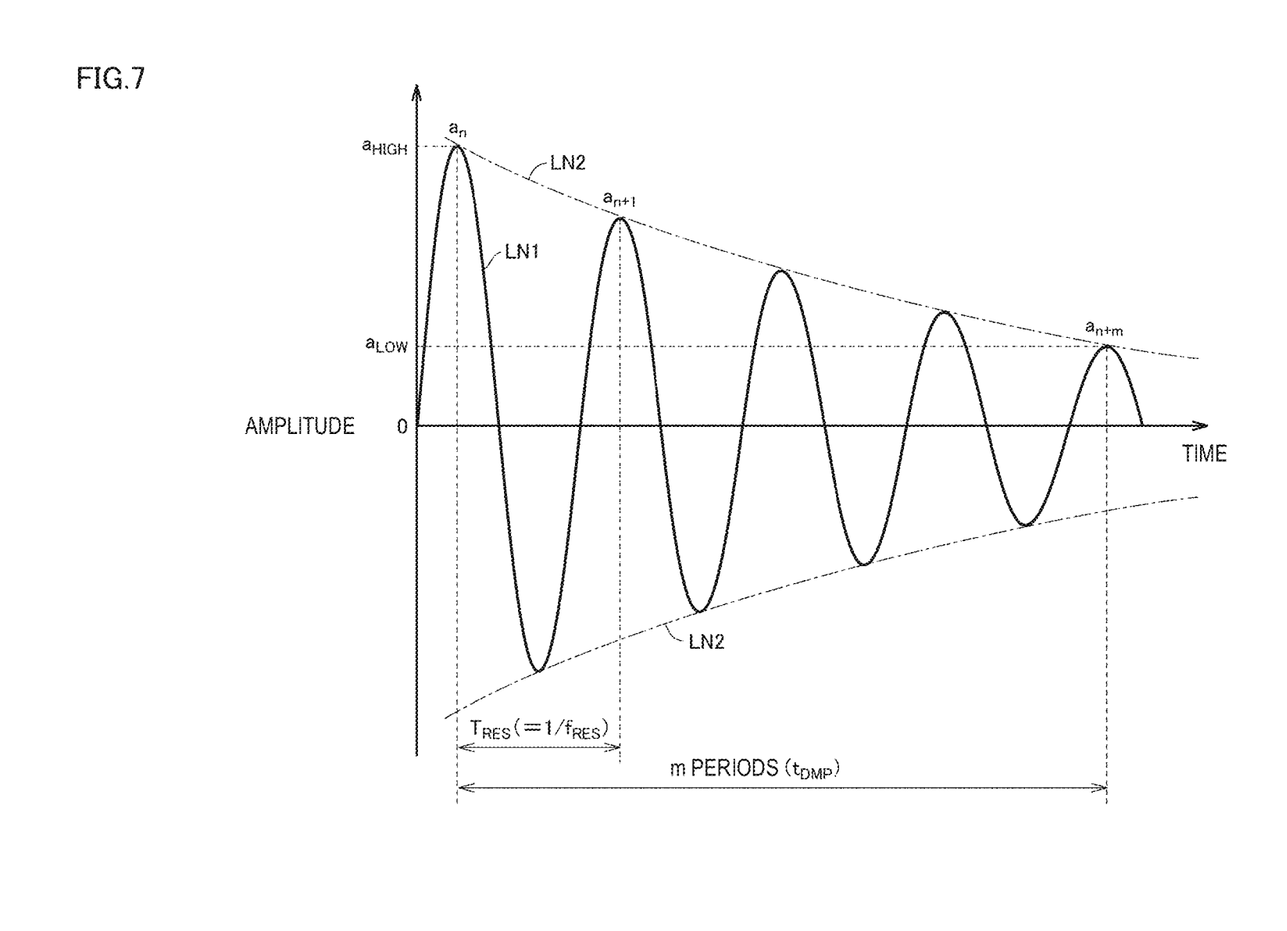
FIG. 7 is a diagram for explaining technical details of how the Q factor and the resonant frequency are measured from a reverberation signal in a receive signal.

With reference to FIG. 7, technical details of how the resonant frequency measuring circuit 250 and the Q-factor measuring circuit 210 measure the resonant frequency and the Q factor, respectively, will be further described.

Referring to FIG. 7, when the transmitting electrode 121 transmits ultrasonic waves, the ultrasonic transducer 120 continues to vibrate at the natural frequency (resonant frequency) of the ultrasonic transducer 120 for a while even after the transmission ends. This vibration is referred to as "reverberant vibration", and the signal appearing in the receive signal at this point is referred to as "reverberation signal". As represented by a solid curve LN1 in FIG. 7, the reverberation signal is a signal that vibrates while gradually decreasing in amplitude with time.

The period of time between adjacent peaks of the reverberation signal is a period $T_{RES}$ of reverberant vibration, and the reciprocal of the period $T_{RES}$ corresponds to the resonant frequency $f_{RES}$ $(=1/T_{RES})$ of the ultrasonic transducer 120. Therefore, the resonant frequency of the ultrasonic transducer 120 is able to be measured by measuring the time interval between adjacent peaks, or by measuring the time interval between zero-crossing points at which the amplitude is zero.

The Q factor may be typically expressed as $Q=1/2\zeta$, where $\zeta$ is the damping ratio of a damping signal. When, as in FIG. 7, the amplitude decays from an amplitude $a_n$ to an amplitude $a_{n+m}$ over m periods, the Q factor may be expressed by the following equation (1).

Equation 1

$$Q = \frac{1}{2\zeta} = \frac{\pi \cdot m}{\ln \frac{a_n}{a_{n+m}}} \quad (1)$$

However, the calculation technique using the equation (1) requires an additional circuit that determines the amplitude of each peak of the reverberation signal. By using the envelope (indicated by a dot-and-dash curve LN2 in FIG. 7) of the reverberation signal, the equation (1) may be rewritten as the following equation (2), where $a_{HIGH}$ and $a_{LOW}$ are amplitudes at any two points on the envelope, and $t_{DMP}$ is the damping time between the two points.

Equation 2

$$Q = \frac{\pi \cdot m}{\ln \frac{a_n}{a_{n+m}}} = \frac{\pi}{\ln \frac{a_{HIGH}}{a_{LOW}}} \cdot \frac{t_{DMP}}{T_{RES}} \quad (2)$$

In FIG. 7, for ease of understanding, the two amplitudes $a_{HIGH}$ and $a_{LOW}$ are expressed as peak amplitudes $a_n$ and $a_{n+m}$, and the relationship $t_{DMP}=m \cdot T_{RES}$ is satisfied. However, the two amplitudes do not necessarily need to be peak amplitudes, and may be any points on the envelope. That is, using the envelope makes it possible to measure the Q factor without detecting peak amplitudes.

Figure 8:
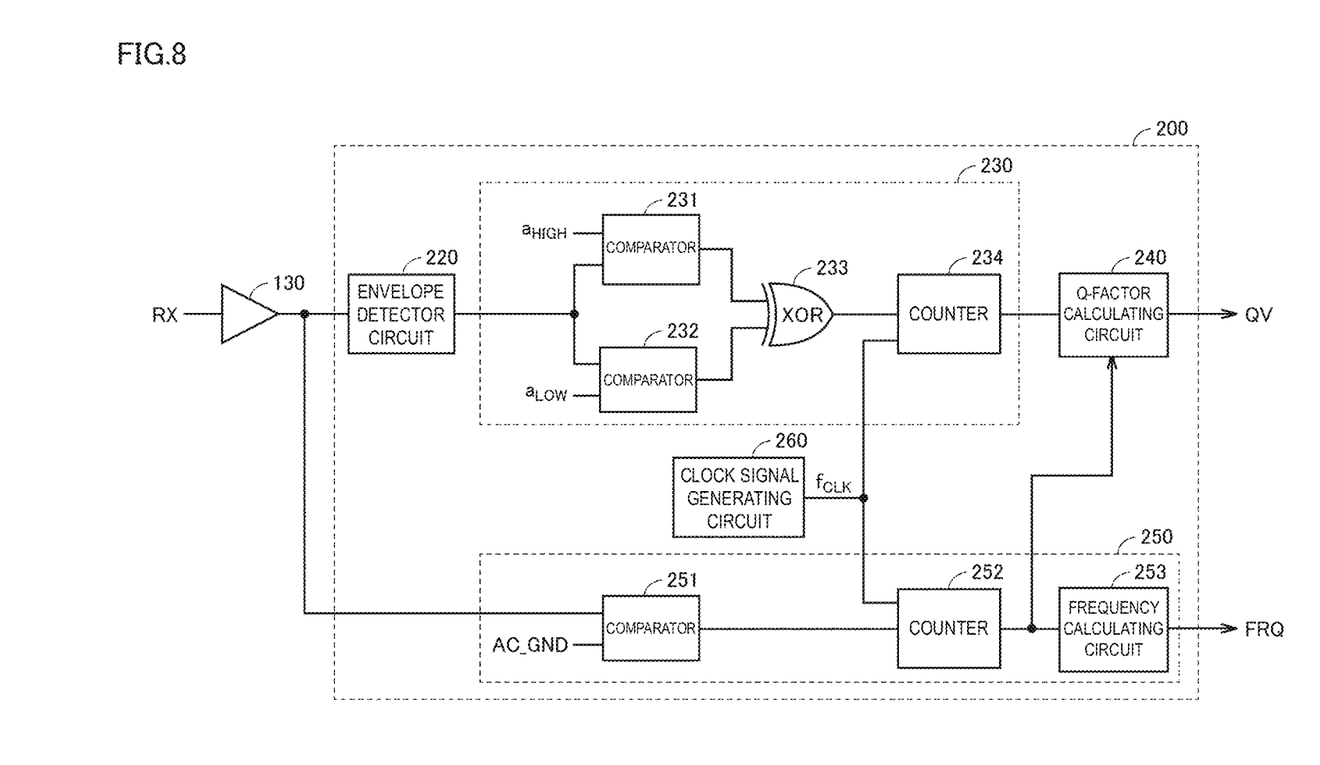
FIG. 8 is a diagram for explaining further details of the detecting circuit illustrated in FIG. 6.

FIG. 8 is a diagram illustrating details of the damping time measuring circuit 230 and the resonant frequency measuring circuit 250 in FIG. 6 that execute the computation illustrated in FIG. 7.

Referring to FIG. 8, the resonant frequency measuring circuit 250 includes a comparator 251, a counter 252, and a frequency calculating circuit 253.

The comparator 251 compares an amplified receive signal to an alternating-current ground potential AC_GND, removes a direct-current bias in the receive signal, and converts the receive signal into an alternating-current signal. The counter 252 counts the time interval between zero-crossing points of the receive signal output from the comparator 251. Based on the counter value from the counter 252, the frequency calculating circuit 253 calculates the period $T_{RES}$ of the reverberation signal from the zero-crossing time points, and calculates the resonant frequency $f_{RES}$ (=FRQ) by taking the reciprocal of the period $T_{RES}$.

The damping time measuring circuit 230 includes comparators 231 and 232, an exclusive OR (XOR) circuit 233, and a counter 234.

The comparator 231 compares the envelope value to the threshold $a_{HIGH}$ on the high amplitude side, and the comparator 232 compares the envelope value to the threshold $a_{LOW}$ on the low amplitude side. From the outputs of the comparators 231 and 232, the XOR circuit 233 continues to output a logical HIGH signal until the amplitude $a_{HIGH}$ on the envelope decays to $a_{LOW}$. By counting the time during which the output from the XOR circuit 233 is logical HIGH, the counter 234 calculates the damping time $t_{DMP}$ taken by the amplitude on the envelope to decay from $a_{HIGH}$ to $a_{LOW}$. Then, the Q-factor calculating circuit 240 calculates the Q factor from the equation (2) based on the amplitudes $a_{HIGH}$ and $a_{LOW}$, the damping time $t_{DMP}$, and the period $T_{RES}$.

A clock signal generating circuit 260 is further provided in FIG. 8. The clock signal generating circuit 260 outputs a common clock signal $f_{CLK}$ to the counter 234 of the damping time measuring circuit 230 and the counter 252 of the resonant frequency measuring circuit 250. When the common clock signal $f_{CLK}$ is used, the equations $t_{DMP}=N_{DMP}/f_{CLK}$ and $T_{RES}=N_{RES}/f_{CLK}$ are satisfied, where $N_{DMP}$ is the count value of the counter 234 and $N_{RES}$ is the count value of the counter 252. The equation (2) may thus be rewritten as the following equation (3).

Equation 3

$$Q = \frac{\pi}{\ln \frac{a_{HIGH}}{a_{LOW}}} \cdot \frac{t_{DMP}}{T_{RES}} = \frac{\pi}{\ln \frac{a_{HIGH}}{a_{LOW}}} \cdot \frac{N_{DMP} \cdot \frac{1}{f_{CLK}}}{N_{RES} \cdot \frac{1}{f_{CLK}}} = \frac{\pi}{\ln \frac{a_{HIGH}}{a_{LOW}}} \cdot \frac{N_{DMP}}{N_{RES}} \quad (3)$$

That is, by using the common clock signal $f_{CLK}$ for the counters 234 and 252, the Q factor is able to be measured using only the count values of the counters. This makes it possible to eliminate the influence of frequency accuracy of the clock signal, and thus to further improve accuracy in measuring the Q factor.

The Q factor and the resonant frequency measured as described above are input to the anomaly determining circuit 150, which determines an anomaly associated with adhesion of water droplets and mud based on such relationships as those shown in FIGS. 4A and 4B and FIGS. 5A and 5B.

As described above, a three-terminal ultrasonic transducer is provided, and a detecting circuit is connected to the receiving electrode of the ultrasonic transducer to measure the resonant frequency and the Q factor of the ultrasonic transducer. This reduces the influence of the impedance of the transmitting circuit, and improves accuracy in measuring the resonant frequency and the Q factor. It is thus possible to improve accuracy in detecting an anomaly associated with adhesion of water droplets and mud to the ultrasonic transducer.

Figure 9:
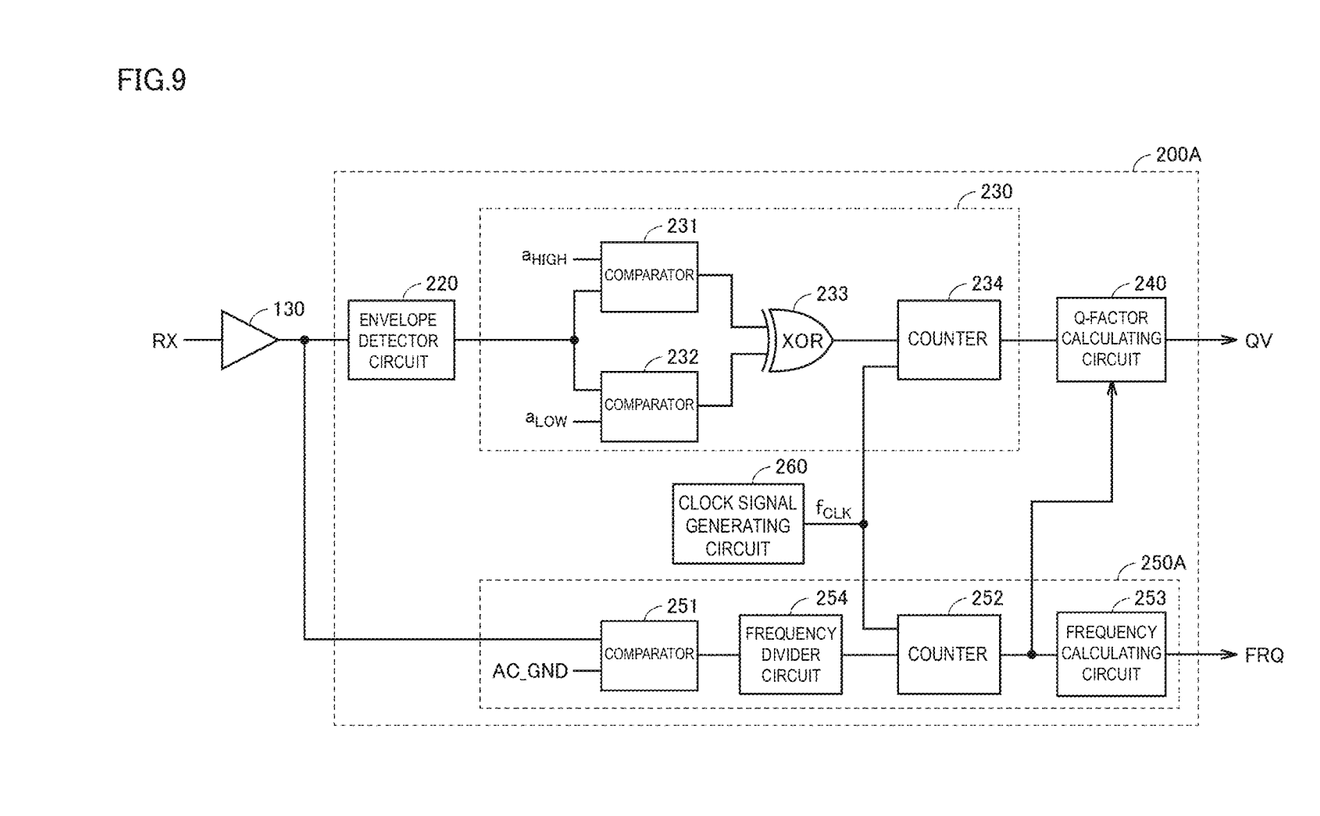
FIG. 9 is a diagram illustrating a modification of the detecting circuit illustrated in FIG. 1.

FIG. 9 is a diagram illustrating a modification of the detecting circuit of the ultrasonic apparatus 100 according to the first preferred embodiment. A detecting circuit 200A according to a first modification is obtained by adding a frequency divider circuit 254 to the resonant frequency measuring circuit 250 of the detecting circuit 200 illustrated in FIG. 8. Referring to FIG. 9, the resonant frequency measuring circuit 250A includes the comparator 251, the frequency divider circuit 254, the counter 252, and the frequency calculating circuit 253. Of the elements illustrated in FIG. 9, the same or similar elements as those illustrated in FIG. 8 will not be described again here.

Referring to FIG. 9, the frequency divider circuit 254 divides the frequency of the receive signal output from the comparator 251. Based on the signal frequency-divided by the frequency divider circuit 254, the counter 252 calculates the period $T_{RES}$ of the reverberation signal. Since the frequency divider circuit 254 enables the period $T_{RES}$ (i.e., resonant frequency $f_{RES}$) to be calculated based on multiple periods of time, the resolution (precision) of the measured resonant frequency is able to be further improved.

Figure 10:
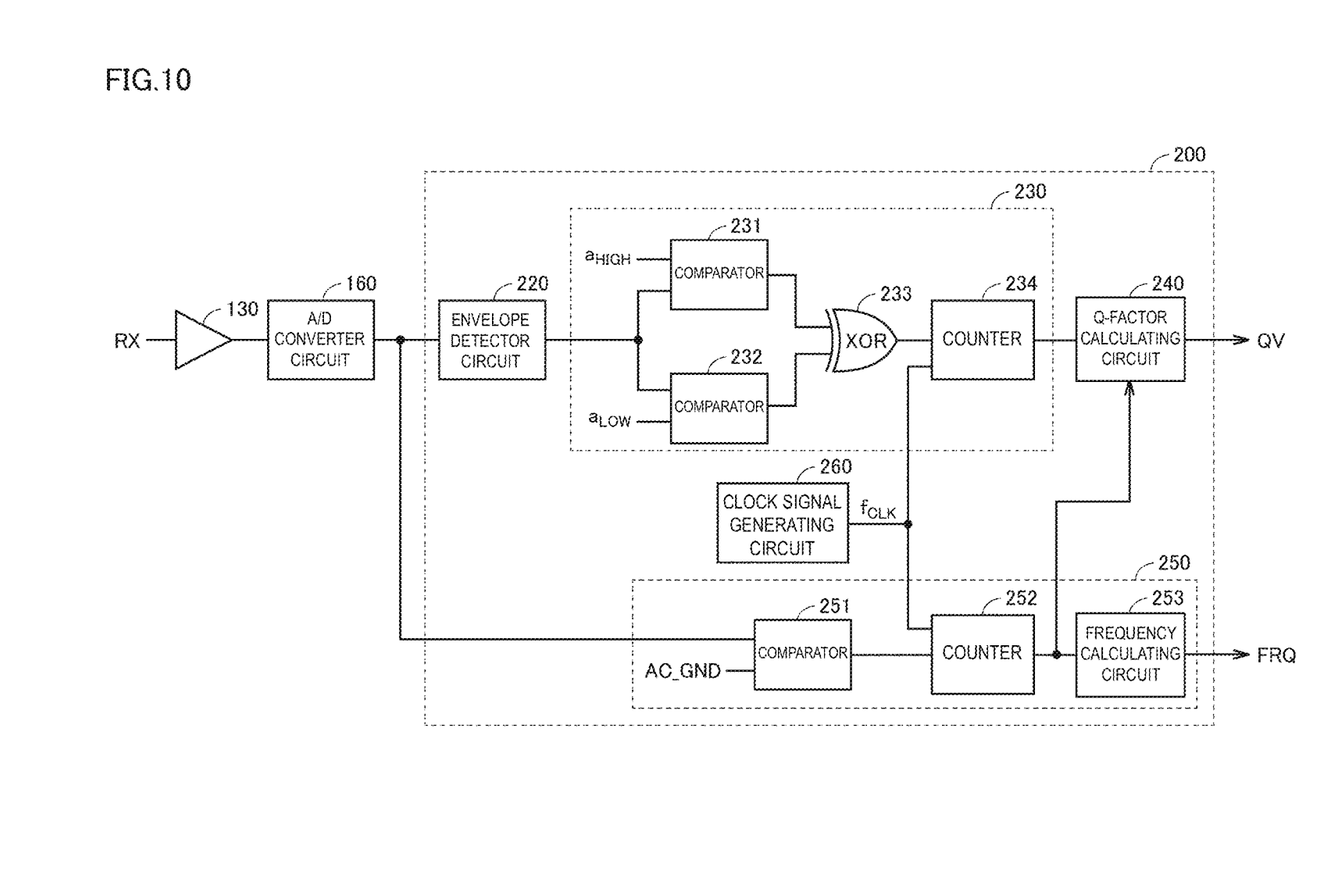
FIG. 10 is a diagram illustrating a modification of the ultrasonic apparatus illustrated in FIG. 1.

FIG. 10 is a diagram illustrating a second modification obtained by adding an A/D converter circuit 160 upstream of the detecting circuit 200 in the ultrasonic apparatus 100 of the first preferred embodiment. In the modification illustrated in FIG. 10, signal processing in the detecting circuit 200 is executed by a digital circuit.

The configuration of the second modification may be combined with the configuration of the first modification.

Second Preferred Embodiment

When a three-terminal ultrasonic transducer is provided as in the first preferred embodiment, the influence of the impedance of the transmitting circuit 110 is able to be reduced to a certain extent. When the impedance of the transmitting circuit 110 varies, however, the measured electrostatic capacitance value may also vary.

A second preferred embodiment of the present invention described herein provides a configuration in which, when the resonant frequency and the Q factor are measured in the detecting circuit 200 on the receiving side, the transmitting electrode 121 is grounded so as to fix the impedance of the transmitting circuit 110 and stabilize the measurement of electrostatic capacitance.

Figure 11:
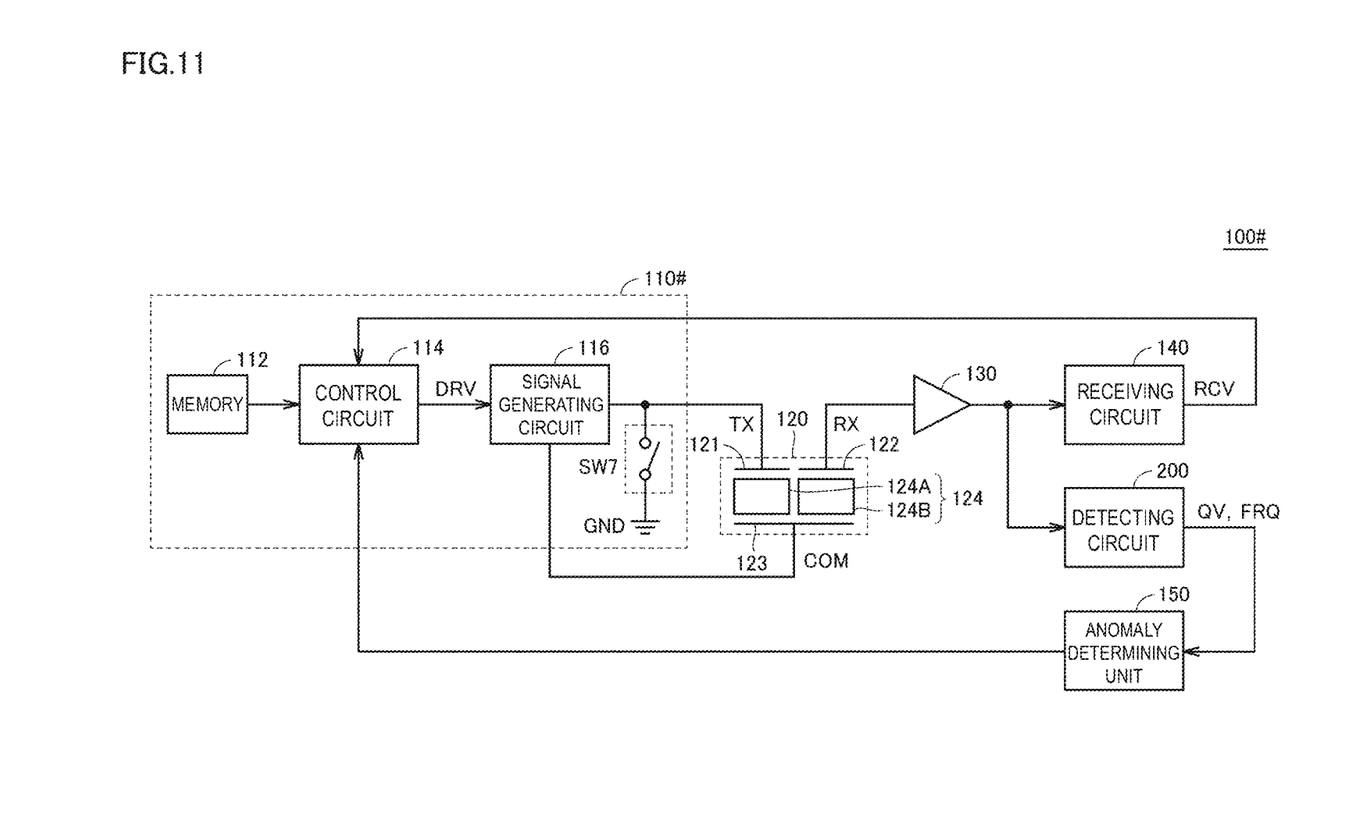
FIG. 11 is a block diagram illustrating a configuration of an ultrasonic apparatus according to a second preferred embodiment of the present invention.

FIG. 11 is an overall block diagram of an ultrasonic apparatus 100 # according to the second preferred embodiment. In FIG. 11, a transmitting circuit 110 # replaces the transmitting circuit 110 of the first preferred embodiment illustrated in FIG. 1. The transmitting circuit 110 # includes a switch SW7, as well as the components of the transmitting circuit 110 illustrated in FIG. 1. The switch SW7 enables and disables conduction between the transmitting electrode 121 and the ground potential GND. When the detecting circuit 200 measures the resonant frequency and the Q factor, the switch SW7 is brought into conduction to connect the transmitting electrode 121 to the ground potential GND.

Figure 12:
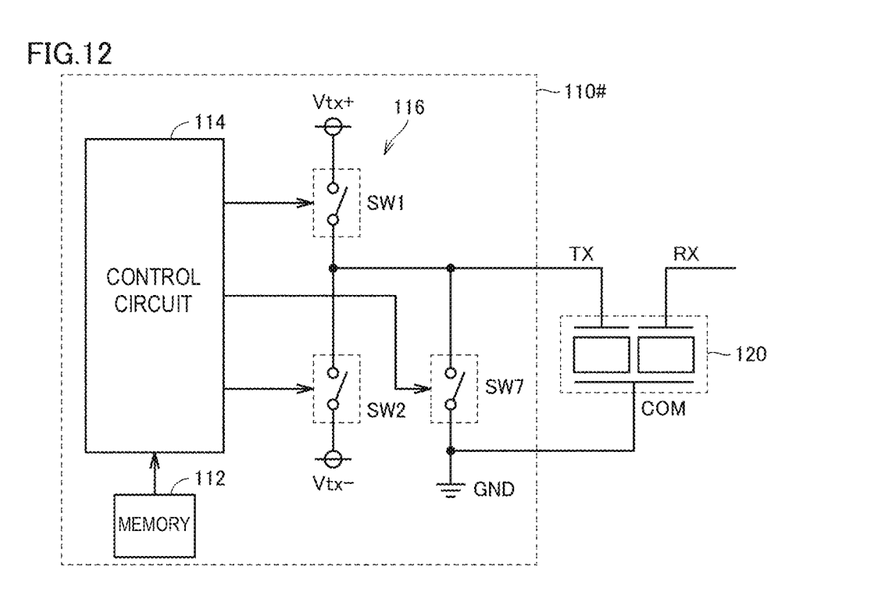
FIG. 12 is a diagram illustrating a transmitting circuit illustrated in FIG. 11.

FIG. 12 is a diagram corresponding to FIG. 2 of the first preferred embodiment. FIG. 12 illustrates the transmitting circuit 110 # in which the signal generating circuit 116 is defined by a half-bridge circuit. In the transmitting circuit 110 #, the switch SW7 is electrically connected at one end thereof to a connection node between the switch SW1 and the switch SW2 (i.e., to the transmitting electrode 121), and connected at the other end thereof to the ground potential GND. The switch SW7 is driven by the control circuit 114 and brought into conduction when the resonant frequency and the Q factor are measured in the detecting circuit 200.

The impedance between TX and COM is thus short-circuited and completely removed. This makes it possible to eliminate the influence of the impedance of the transmitting circuit.

While not shown, if the signal generating circuit 116 is defined by a full-bridge circuit, the influence of the impedance of the transmitting-side circuit is able to be eliminated in the same or similar manner as in FIG. 12 without requiring the switch SW7. More specifically, since TX and COM are able to be short-circuited by bringing the switching element SW4 into conduction in FIG. 3, there is no need to add the switch SW7.

Figure 13:
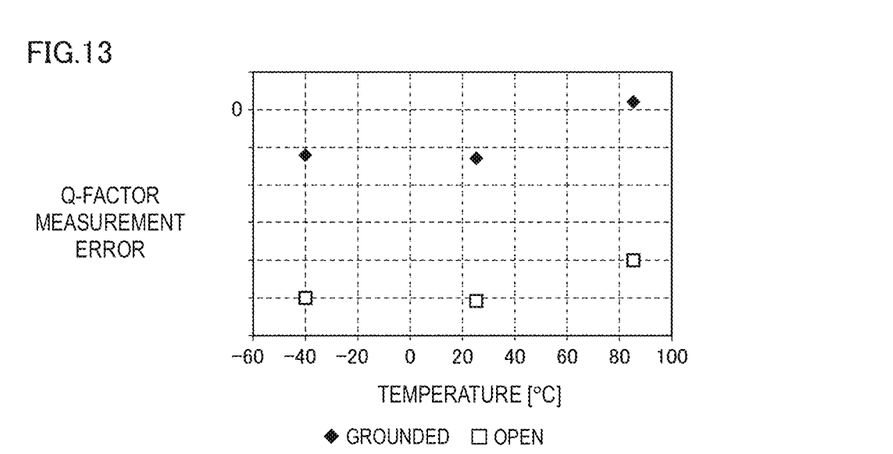
FIG. 13 is a graph that compares the occurrence of Q-factor measurement errors between when a transmitting electrode is grounded and when it is not grounded.
Figure 14:
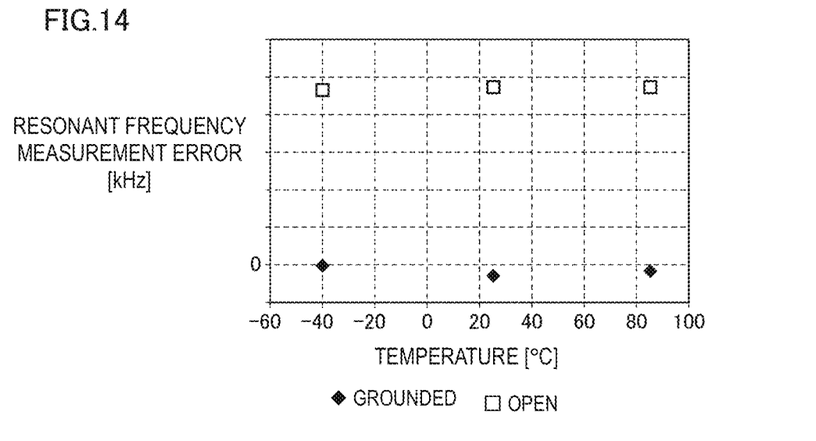
FIG. 14 is a graph that compares the occurrence of resonant frequency measurement errors between when the transmitting electrode is grounded and when it is not grounded.

FIG. 13 and FIG. 14 are graphs showing a result of simulation which simulated errors from the designed values of Q-factor and resonant frequency under conditions in which, during measurement of the Q factor and the resonant frequency, the transmitting electrode was grounded (second preferred embodiment) and not grounded (first preferred embodiment). For both of the Q factor and the resonant frequency, the simulation was performed at an element temperature of about −40° C., about +25° C., and about +85° C.

FIG. 13 and FIG. 14 show that at any temperature, for both of the Q factor and the resonant frequency, the measurement error that occurred when the transmitting electrode was grounded was smaller than the measurement error that occurred when the transmitting electrode was not grounded (i.e., the measurement error in the former case was closer to zero than that in the latter case was).

As described above, a three-terminal ultrasonic transducer is provided, a detecting circuit is connected to the receiving electrode of the ultrasonic transducer to measure the resonant frequency and the Q factor of the ultrasonic transducer, and the transmitting electrode is grounded when the resonant frequency and the Q factor are measured. Thus, the influence of the impedance of the transmitting circuit on the resonant frequency and the Q factor is able to be eliminated. This further improves accuracy in measuring the resonant frequency and the Q factor, and improves accuracy in detecting an anomaly associated with adhesion of water droplets and mud to the ultrasonic transducer.

The second preferred embodiment is also applicable to the modifications of the first preferred embodiment described above.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An ultrasonic apparatus comprising:
a three-terminal ultrasonic transducer including a common electrode, a transmitting electrode, and a receiving electrode independent of the transmitting electrode;
a transmitting circuit to output a driving signal to the transmitting electrode to cause the ultrasonic transducer to transmit ultrasonic waves;
a receiving circuit to receive a receive signal from the receiving electrode;

a frequency measuring circuit to measure a resonant frequency of the ultrasonic transducer from a reverberation signal in the receive signal; and a Q-factor measuring circuit to measure a Q factor of the ultrasonic transducer from the reverberation signal.

2. The ultrasonic apparatus according to claim 1, further comprising a determiner to determine an anomaly of the ultrasonic transducer based on the Q factor measured by the Q-factor measuring circuit and the resonant frequency measured by the frequency measuring circuit.

3. The ultrasonic apparatus according to claim 1, further comprising a switch to ground the transmitting electrode when the Q-factor measuring circuit measures the Q factor and the frequency measuring circuit measures the resonant frequency.

4. The ultrasonic apparatus according to claim 1, wherein the Q-factor measuring circuit includes:
   an envelope detecting circuit to detect an envelope of an amplitude of the reverberation signal;
   a damping time measuring circuit to measure a damping time taken by the amplitude to decay from a first amplitude to a second amplitude on the envelope; and
   a Q-factor calculating circuit to calculate the Q factor of the ultrasonic transducer based on the first and second amplitudes, the damping time, and the resonant frequency of the ultrasonic transducer.

5. The ultrasonic apparatus according to claim 4, further comprising a clock signal generating circuit to generate a clock signal used in common by the Q-factor measuring circuit and the frequency measuring circuit.

6. The ultrasonic apparatus according to claim 1, wherein the ultrasonic transducer includes a piezoelectric body.

7. The ultrasonic apparatus according to claim 6, wherein the piezoelectric body includes a transmitting region to transmit ultrasonic waves, and a receiving region to receive reflected ultrasonic waves.

8. The ultrasonic apparatus according to claim 7, wherein the transmitting electrode is disposed opposite to the common electrode, with the transmitting region interposed therebetween, and is electrically connected to the transmitting region.

9. The ultrasonic apparatus according to claim 7, wherein the receiving electrode is disposed opposite to the common electrode, with the receiving region interposed therebetween, and is electrically connected to the receiving region.

10. The ultrasonic apparatus according to claim 7, wherein the common terminal is electrically connected to both of the transmitting region and the receiving region.

11. The ultrasonic apparatus according to claim 1, further comprising:
    an amplifier; wherein
    the receiving electrode is connected to the receiving circuit, with the amplifier interposed therebetween.

12. The ultrasonic apparatus according to claim 11, wherein the amplifier is an inverting amplifier circuit including a resistor and an operational amplifier.

* * * * *